United States Patent
Ding et al.

(10) Patent No.: US 8,745,169 B2
(45) Date of Patent: Jun. 3, 2014

(54) INTELLIGENT SYSTEM OF UNIFIED CONTENT POSTING

(75) Inventors: Junyong Ding, Shanghai (CN); Bo Huang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 271 days.

(21) Appl. No.: 12/519,756

(22) PCT Filed: Dec. 30, 2006

(86) PCT No.: PCT/CN2006/003701
§ 371 (c)(1),
(2), (4) Date: Feb. 12, 2010

(87) PCT Pub. No.: WO2008/086638
PCT Pub. Date: Jul. 24, 2008

(65) Prior Publication Data
US 2010/0146080 A1   Jun. 10, 2010

(51) Int. Cl.
*G06F 15/173* (2006.01)

(52) U.S. Cl.
USPC .......................................... 709/219; 709/223

(58) Field of Classification Search
USPC .................................. 709/219, 223
See application file for complete search history.

(56) References Cited

U.S. PATENT DOCUMENTS

| | | | | |
|---|---|---|---|---|
| 7,020,685 B1* | 3/2006 | Chen et al. | ..................... | 709/204 |
| 2005/0198299 A1* | 9/2005 | Beck et al. | ..................... | 709/226 |
| 2006/0089944 A1 | 4/2006 | Dandekar et al. | | |
| 2006/0173985 A1 | 8/2006 | Moore | | |
| 2006/0218488 A1 | 9/2006 | Shah et al. | | |

FOREIGN PATENT DOCUMENTS

| | | |
|---|---|---|
| CN | 1756170 | 4/2006 |
| JP | 2002351828 | 12/2002 |
| JP | 2003-196315 | 7/2003 |
| JP | 2004-295807 | 10/2004 |
| JP | 2006120065 | 5/2006 |

OTHER PUBLICATIONS

Nottingham, M. et al., "The Atom Syndication Format", Network Working Group, RFC 4287, Category: Standards Track, 41 pages, found at—http://www.ietf.org/rfc/rfc4287.

Third Office Action mailed Oct. 22, 2012 for Chinese Patent Application No. 20068005683.0.

Non Final Notice of Reasons for Rejection issued for Japanese Patent Application No. 2012-015835, mailed May 7, 2013, 4 pages.

Decision of Rejection from the Board of Appeals issued for Japanese Patent Application No. 2009-543321, mailed May 14, 2013.

(Continued)

*Primary Examiner* — Adnan Mirza
(74) *Attorney, Agent, or Firm* — Blakely, Sokoloff, Taylor & Zafman LLP

(57) ABSTRACT

A method, apparatus and system is applied to provide a unified content posting mechanism. The method comprises: receiving a single version of content to be posted on one or more remote servers; formatting the received content according to one or more predetermined criteria for posting on the one or more remote servers; posting the formatted content on the one or more remote servers via one or more post services. The method, apparatus and system provide the standardized and simplified process of posting content to the websites.

21 Claims, 14 Drawing Sheets

(56) References Cited

OTHER PUBLICATIONS

Hirata, Masafumi, Development of the Blog Client for Cellular Phones, IPSJ SIG Technical Reports, Japan, Information Processing Society of Japan, vol. 2005, No. 71, pp. 25-30. (Jul. 22, 2005).

Decision on Rejection issued for Chinese Patent Application No. 200680056853.0, mailed Apr. 3, 2013.

Supplementary European Search Report mailed Aug. 22, 2012 for EP Patent Application No. EP 06 84 0731.

Invitation to Submit Applicants Opinion from the Appeal Board mailed Sep. 13, 2012 by Japanese Associate, for Japanese Patent Application No. 2009-543321.

Non-Final Office Action mailed Jun. 14, 2011 for Japanese Patent Application No. 2009-543321.

Office Action from 200680056853 mailed Jun. 22, 2011, 8 pgs.

Japanese Office Action mailed Sep. 27, 2011 for Japanese Application No. 2009-543321, 2 pages.

International Search Report and Written Opinion mailed Oct. 18, 2007 for Int'l Application No. PCT/CN2006/003701.

International Preliminary Report on Patentability mailed Jul. 9, 2009 for Int'l Application No. PCT/CN2006/003701.

Kazuhiro, Taguchi, "Teaching Useful Services to Web Workers: A Web Administrator's Current Knowledge", vol. 3, Japan, Impress Holdings Inc. R&D, Dec. 18, 2006, pp. 48-49.

Masafumi, Hirata, "Development of the Blog Client for Cellular Phones", vol. 2005, No. 71, Jul. 22, 2005, IPSJ SIG Technical Reports, Information Processing Society of Japan, pp. 25-30.

Nottingham, M. et al., "The Atom Syndication Format", Network Working Group, RFC 4287, Category: Standards Track, 41 pages, found at—Dec. 2005 http://www.ietf.org/rfc/rfc4287.

Second Office Action mailed May 2, 2012 for Chinese Patent Application No. 20068005683.0.

* cited by examiner

| post 610 | title | 615 |
|---|---|---|
| | time-stamp | 620 |
| | author 625 | name 630 |
| | | contact 635 |
| | category | 640 |
| | keywords | 645 |
| | abstract | 650 |
| | extension | 655 |
| | content 660 | item 665 |
| | | item 670 |
| | | item ... 675 |
| | signature | 680 |

FIG. 6

| feed 700 | title 720 |
| | description 730 |
| | url 740 |
| | category 750 |
| | extension 760 |

FIG. 7

| feedlist 800 | title 820 | |
|---|---|---|
| | description 830 | |
| | extension 840 | |
| | feed ... 805 | title 850 |
| | | description 860 |
| | | url 870 |
| | | category 880 |
| | | extension 890 |

INTELLIGENT SYSTEM OF UNIFIED CONTENT POSTING

CROSS REFERENCE TO RELATED APPLICATION

This patent application is a U.S. National Phase application under 35 U.S.C. §371 of International Application No. PCT/CN2006/003701, filed on Dec. 30, 2006, entitled AN INTELLIGENT SYSTEM OF UNIFIED CONTENT POSTING.

TECHNICAL FIELD

Embodiments of the invention relate to posting techniques. More particularly, embodiments of the invention relate to standardized and simplified process of posting content to websites.

BACKGROUND

Posting information on the Internet has become a common aspect of every day life. Picture sharing sites, blogs, and other media sites require users to log on to their websites and individually post the media objects for different websites.

RSS (Real Simple Syndication) technology has made it convenient for users to access aggregated content over the Internet. RSS has improved access to data and information by giving users the choice to use aggregators of RSS feeds to fetch the latest articles located in different websites, such as forums, blogs, news sites, photo galleries. RSS features provide the users the ability to select websites to be added by the aggregator by clicking the RSS icon on their websites.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 6 is a conceptual diagram of one embodiment of a post format structure.

FIG. 7 is a conceptual diagram of one embodiment of a post feed.

FIG. 8 is a conceptual diagram of one embodiment of a post feed list.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

Posting content on the Internet to various website can be a bothersome task. Users usually log into the website and follow various instructions to get their content posted. Techniques described herein may provide a standardized, low complexity, and simplified procedure for improving the posting of content onto websites. In one embodiment, users may submit content only once, instead of logging into different websites to repeatedly submit content to be posted.

Figure 1:
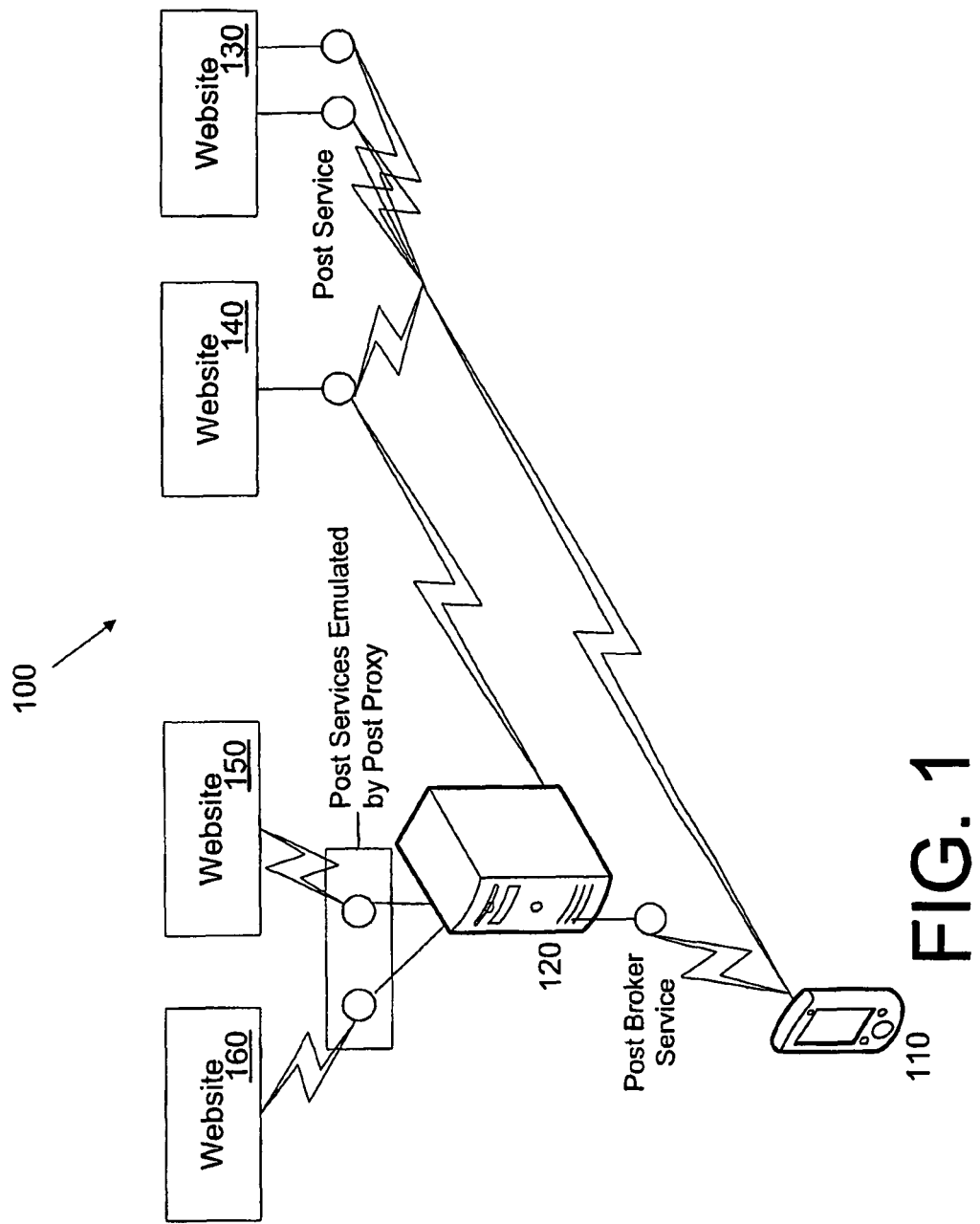
FIG. 1 is a conceptual diagram of one embodiment information posted over a network.

FIG. 1 illustrates one embodiment of posting content to the Internet via a post service. In one embodiment, handheld device 110 may communicate post information over a network to post service broker 120. In alternate embodiments, handheld device 110 may be a palm held device, mobile phone, computer terminal, or other type of device capable of storing and communicating information. Post service broker 120 may post the received post information to Web sites 130, 140.

For servers providing no post services (e.g., Web sites 160 and 150), a post proxy layer of a post broker service may emulate post services. Handheld device 110 may directly access post services or post through the post broker services. A Web site may provide multiple post services. In alternate embodiments, content to be posted may be submitted via various devices in different transfer protocols.

Reference to a handheld device as the source of data to be posted is utilized for reasons of simplicity of description and refers to but one embodiment. Data to be posted may be provided by any type of electronic device that may generate, transmit or otherwise process data to be posted to multiple Web sites.

Figure 2:
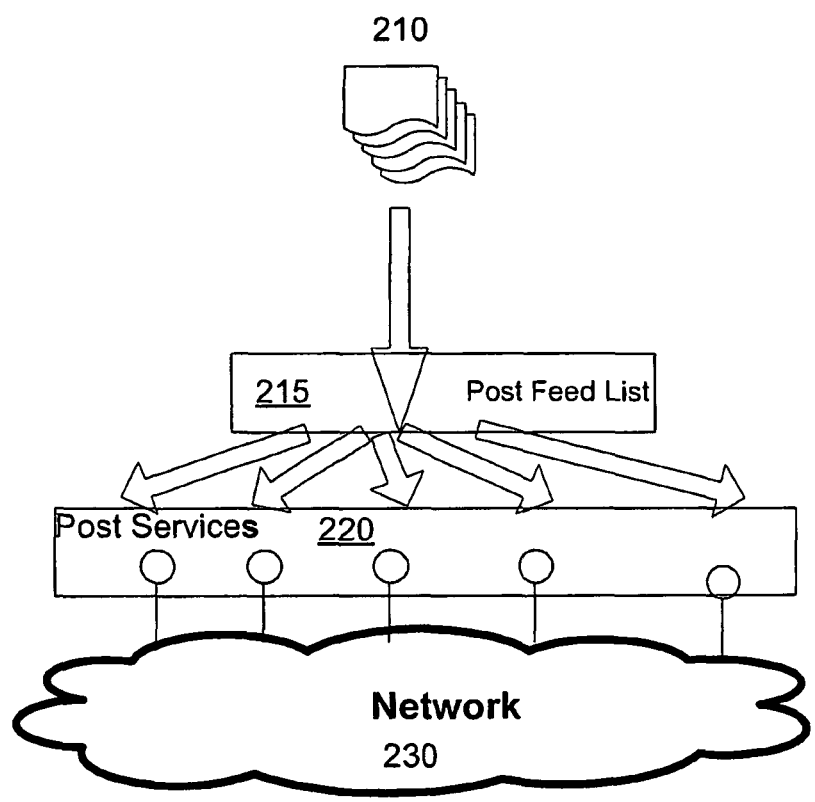
FIG. 2 is a conceptual diagram of one embodiment of a post service.

FIG. 2 illustrates one embodiment of a post service. In one embodiment, original data content 210 is sent to post services 220 based on post feed list 215. Original data content 210 may be in the form of files, data structures, media files, or other types of data. Post feed list 215 may provide identifiers (e.g., addresses) of one or more post services that may be utilized to post original data content 210. Post feed list 215 may be utilized by client software on a source device or a post broker service. In general, one post service may be offered by one web site. Content 210 can then be posted on that web site offering the post services, or to web sites that have corresponding post proxies in the broker services. Content 210 may be stored on device 110 in FIG. 1, or other storage media device.

Figure 3:
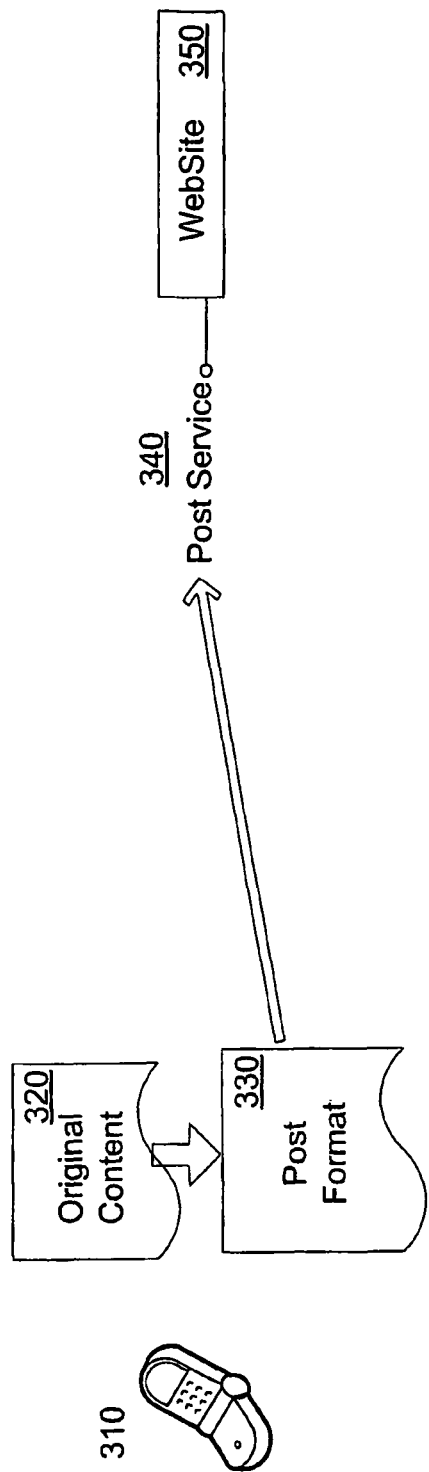
FIG. 3 is a conceptual diagram of one embodiment of a technique of posting via a post service.

FIG. 3 illustrates one embodiment of a technique of posting information on a website via a post service. In one embodiment, original content 320 is stored on device 310. Device 310 may be a mobile phone, notebook, portable hand held device, or a hardwired computer terminal. Original content 320 may consist of picture files, text files, video files, media files, and other computer media files. In one embodiment, original content 320 may be converted to post format 330. Post format 330 may be of the type of post format 610 in FIG. 6.

Post service 340 may receive post format 330 over a network. Post 340 may be described as the format 700 in FIG. 7.

Post service 340 may post original content 320 from the received post format 330 to a website 350.

Figure 4:
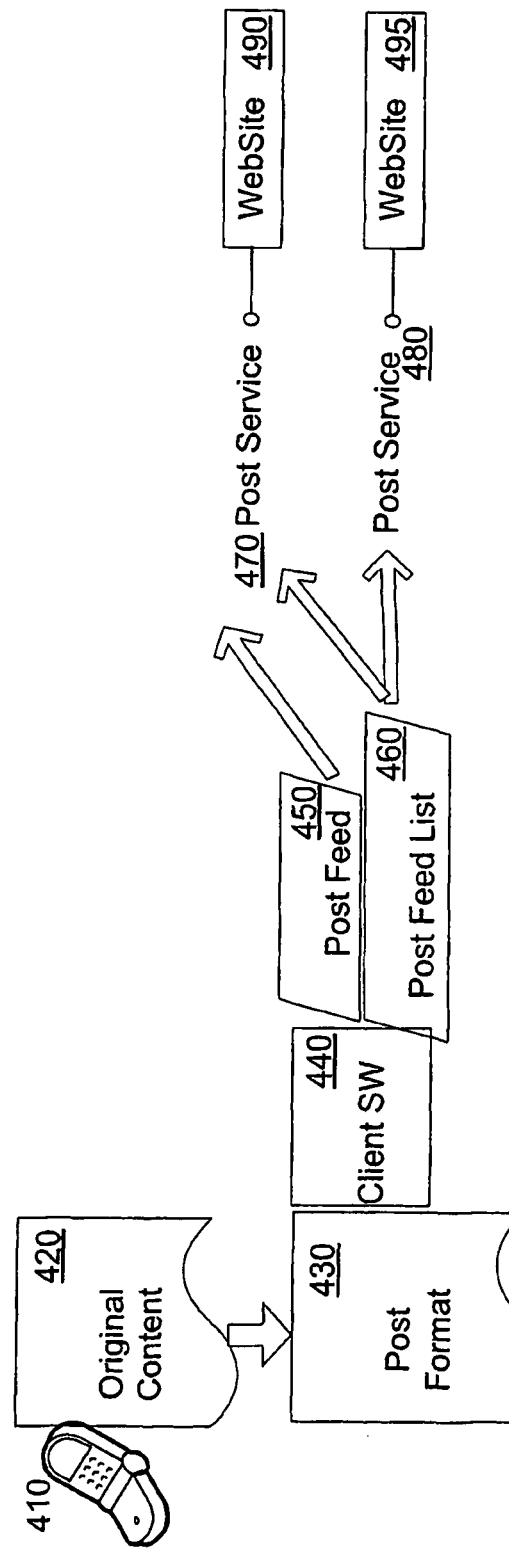
FIG. 4 is a conceptual diagram of one embodiment of a technique of posting via a post service and client software.

FIG. 4 illustrates one embodiment of a technique of posting information on a website (or several websites) via post services and client software. In one embodiment, original content 420 is stored on mobile device 410. Original content 420 may consist of picture files, text files, video files, media files, and other computer media files. Original content 420 may be converted to post format 430. Post format 430 may be of the type of post format 610 in FIG. 6.

In one embodiment, client software 440 may be part of device 410. Client software 440 may contain a post feed 450 and a post feed list 460. Post feed 450 may be of the type of post feed 700 in FIG. 7. Post feed list 460 may be of the type of post feed list 800 in FIG. 8. Post feed lists may be acquired from various sources. For example, software on a client device may include post feed lists for popular Web sites, or post feed lists may be acquired as needed. Post feed lists may be available from one or more Web sites that provide information about posting to Web sites.

Post feed 450 may be utilized to format and/or send a post according to post format 430 to post service 470. Post service 470 may then post original content 420 on website 490. In alternate embodiments, post feed list 460 may contain a list of websites 490 and 495 to which post format 420 may be utilized for data to be posted.

Figure 5:
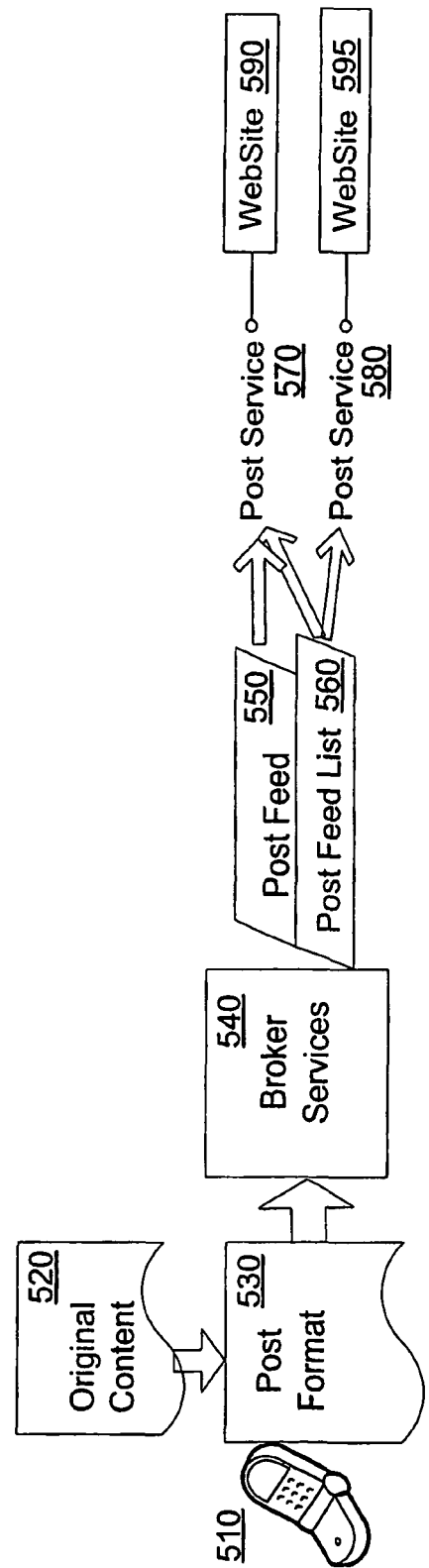
FIG. 5 is a conceptual diagram of one embodiment of a technique of posting via a post service and broker services.

FIG. 5 illustrates one embodiment of a technique of posting information on a website (or several websites) via post services and broker services. In one embodiment, original content 520 is stored on device 510. Original content 520 may consist of picture files, text files, video files, media files, and other computer media files. Original content 520 may be converted to post format 530. Post format 530 may be of the type of post format 600 in FIG. 6.

In one embodiment, post broker services 540 may receive data formatted according to post format 530. Post broker services 540 may of similar type as post broker service 900 in FIG. 9. Post broker services 540 may utilize either post feed 550 or post feed list 560 to invoke post service 570 and/or post service 580. Post services 570 and 580 may then post the content to Web sites 590 and 595, respectively. Post feed 550 may be of the type of post feed 700 in FIG. 7. Post feed list 560 may be of the type of post feed list 800 in FIG. 8.

Client software or a post broker service may utilize information from post feed 550 to identify and invoke post service 570. Post service 570 may then post original content 520 formatted according to post format 530 on website 590. In alternate embodiments, post feed list 560 may contain a list of websites 590 and 595 to which original content 520 formatted according to post format 530 may then be posted.

FIG. 6 illustrates one embodiment of a post format structure. Post 610 may be a unified and extensible format to represent content for posting. General information about the post content may be embedded in the post format. Post 610 may contain title field 615 describing the title of the post. Post 610 may contain time-stamp field 620 describing the time of the post. Post 610 may contain author field 625 describing the author of the post. Author field 625 may further contain name 630 and contact 635 information fields. Post 610 may also contain category field 640, keywords field 645, abstract field 650, and extension field 655 which may describe, identify or categorize content 660 to be posted. Content 660 may be broken down into separate items 665, 670, 675. In alternate embodiments, content 660 may be broken down further or not at all. Post 610 may also contain signature field 680 to identify the post in security operations. In alternate embodiments, more, less or different fields may be embedded in post 610.

FIG. 7 illustrates one embodiment of a post feed structure. Post feed 700 may provide information to describe a post service. Post feed 700 may include title 720 that may provide a name or other identifier for the post service. Post feed 700 may include description field 730 which may describe the post service. Post feed 700 may also include URL field 740 which may include the web address of the post service. Post feed 700 may also include category field 750 describing the type of post service. Post feed 700 may also include extension field 760. In alternate embodiments, more, less or different fields may be part of post feed 700.

FIG. 8 illustrates one embodiment of a post feed list structure. Post feed list 800 may aggregate multiple instances post feed 700 in one list. Feed list 800 may include title 820, which may describe the title of the feed list. Feed list 800 may also include description 830, which may describe the feed list. Feed list 800 may include extension 840. Feed list 800 may also include feed 805. Feed 805 may correspond to post feed 700 in FIG. 7. Feed list 800 may contain one or more instances of feed 805. Title 850, description 860, Uniform Resource Locator (URL) 870, category 880, extension 890 may correspond with title 720, description 730, URL 740, category 750, and extension 760 respectively in FIG. 7. In alternate embodiments, more, less or different fields may be part of feed list 800.

Figure 9:
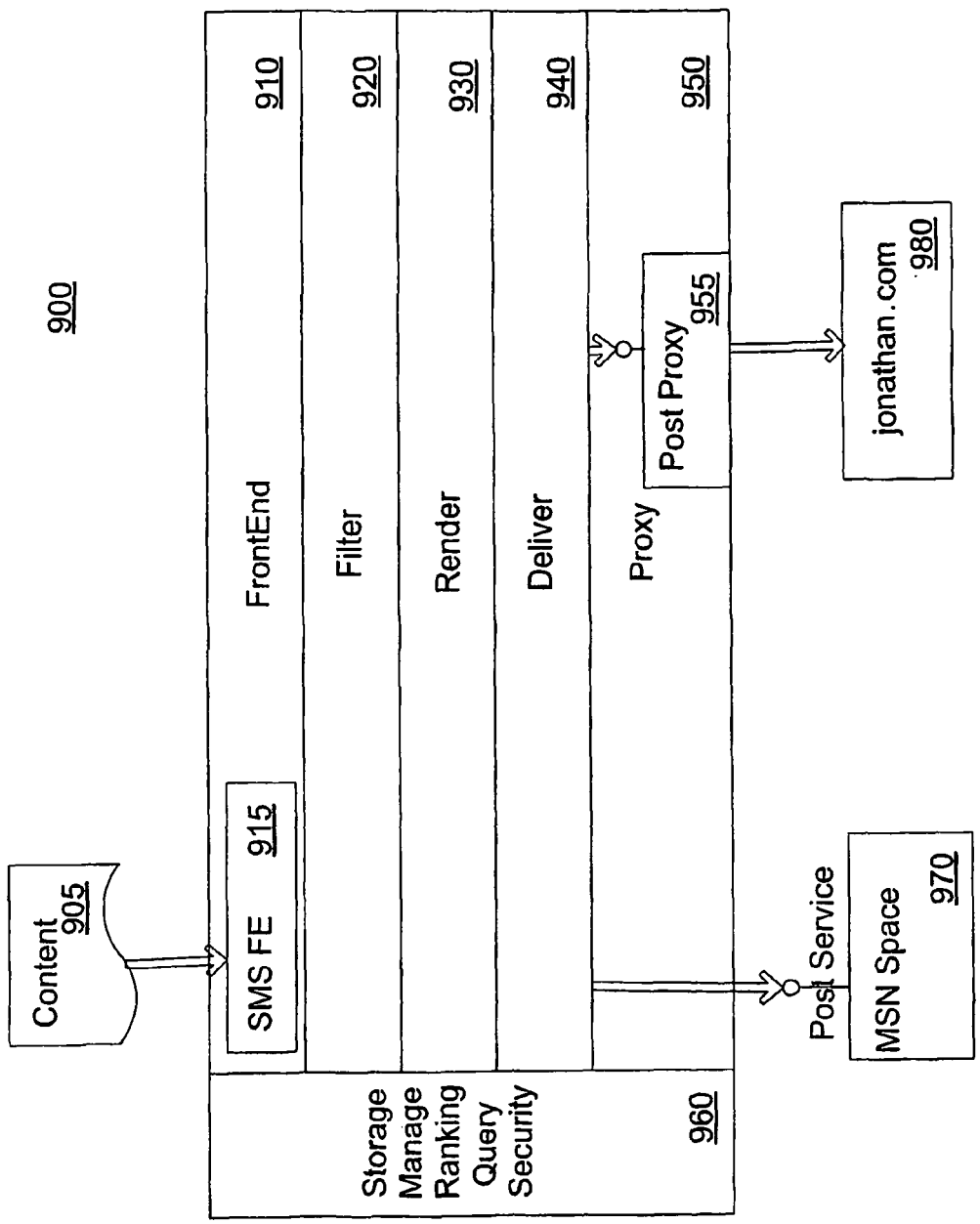
FIG. 9 is a conceptual diagram of one embodiment of a post broker service.

FIG. 9 illustrates one embodiment of a post broker service structure. Post broker service 900 may contain multiple layers to accept submitted contents from users. Each layer may add functionalities related to content processing, Post broker service 900 may contain front end layer 910. Front end layer 910 may make it possible for content to be posted from various devices in different transfer protocols. In one embodiment, front end layer 910 may transfer content into post format from the original type of content. In one embodiment, front end layer 910 receives original content 905 and, the example of SMS-formatted content, converts into post format at SMS front end 915. In alternate embodiments, post broker service 900 may accept content from different devices using different transfer protocols (MMS, SMTP, HTTP etc.) through different types of front ends embedded in front end layer 910. Post broker service 900 may contain filter layer 920. In one embodiment, filter layer 920 may remove redundant or unallowable content from being posted. In alternative embodiments, filter layer 920 may remove content based on other criteria.

Post broker service 900 may contain render layer 930. Render layer 930 may tailor or beautify contents for presenting a nicer representation of the content. In alternative embodiments, render layer 930 may render content based on other criteria. Post broker service 900 may contain deliver layer 940. Deliver layer 940 may ensure that content could be successfully posted by invoking post services. Post broker service 900 may contain proxy layer 950. Proxy layer 950 may simulate a proxy service to make websites that don't provide post services compatible with the post service format (i.e. make sure the successful content posting even though some websites (980 for example) don't provide post services). In one embodiment, proxy layer module 955 may function as an adapter to simulate post services for website 980. In one embodiment, if a site supports post service format, then the data will by pass proxy layer 950 and go straight to website 970. In alternate embodiments, broker service 900 may have less, more, or different layer construction than in FIG. 9.

Post broker service 900 may contain an additional features layer 960. Layer 960 may store user profiles, aggregate post feeds to post feed lists by categories, rank the post services, and provide searching abilities through a query service. In alternate embodiments, more, less, or different features may be available through the post service.

Figure 10:
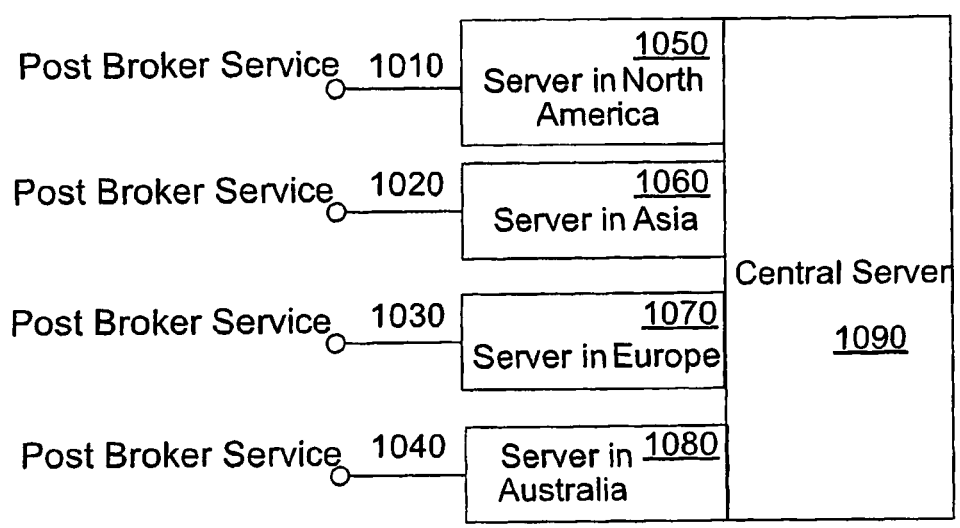
FIG. 10 is a conceptual diagram of one embodiment of distributed post broker services.

FIG. 10 illustrates one embodiment of distributed post broker services. Mirror broker services 1010, 1020, 1030, and 1040 may be deployed in a distributed manner at servers 1050, 1060, 1070, and 1080 respectively. For example, server 1050 may be deployed in North America, server 1060 may be deployed in Asia, server 1070 may be deployed in Europe, and server 1080 may be deployed in Australia. In alternate embodiments, mirror broker services may be deployed on servers in other parts of the world. In one embodiment, servers 1050, 1060, 1070 and 1080 may be connected to central server 1090.

Figure 11:
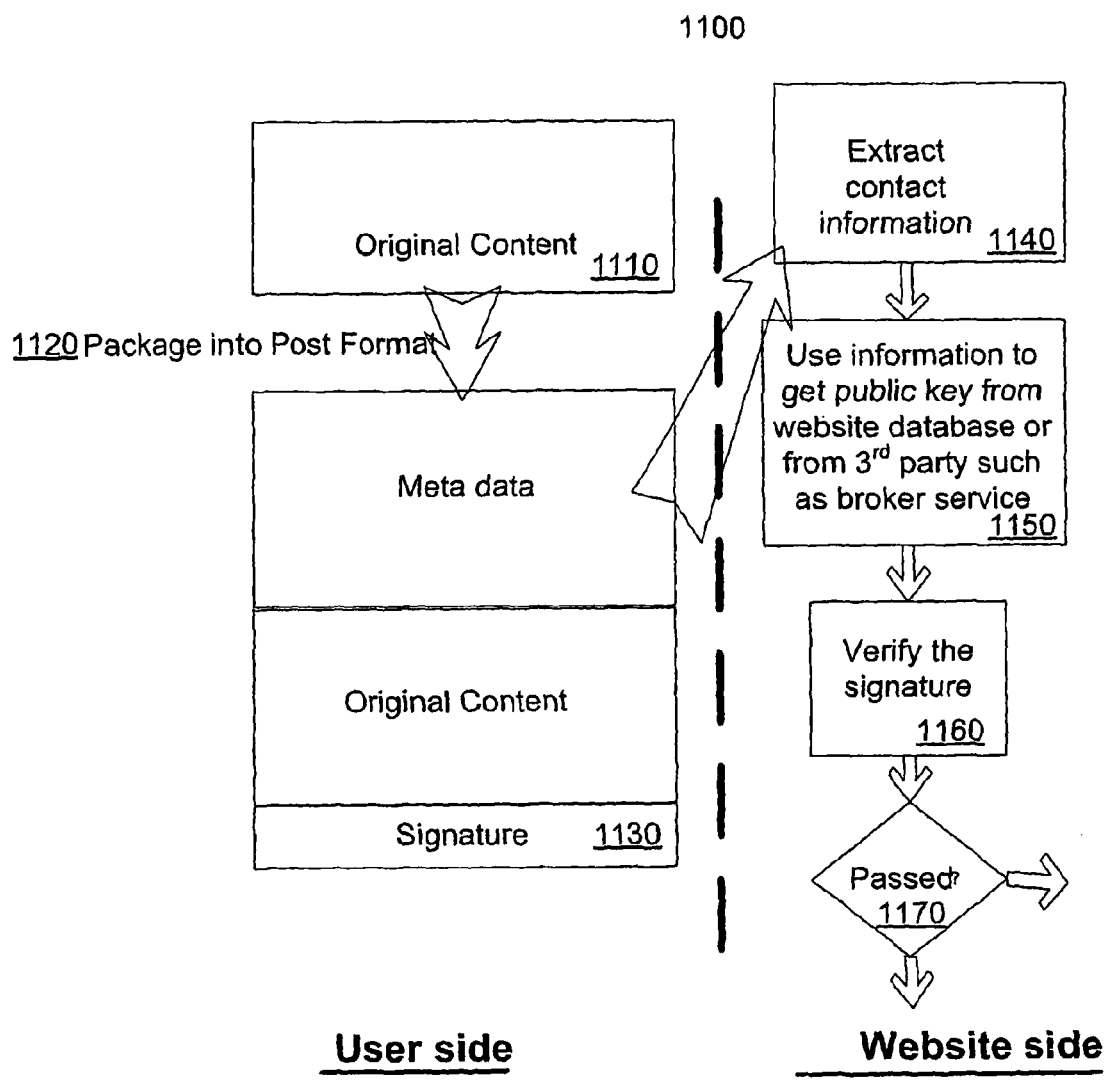
FIG. 11 is a conceptual diagram of one embodiment of a technique to verify user information.

FIG. 11 illustrates a technique to verify user information. In one embodiment, operation 1120 converts original content 1110 into post format 1130. Post format 1130 may embed the user signature within the structure. Operation 1120 may be conducted on the user side. On the side of the website that receives the post, operation 1140 may extract content information about the author and the signature in order to verify with the website information. Operation 1150 may use the extracted information at operation 1140 to get a public key corresponding to the author information from a registered database or from a third party such as a broker service. Operation 1160 may verify the information integrity with the public key received from the database or third party broker by examining the equivalence of the signature. Operation 1170 may either pass the information on to be posted on the website, or may reject the information back to the user side.

Figure 12:
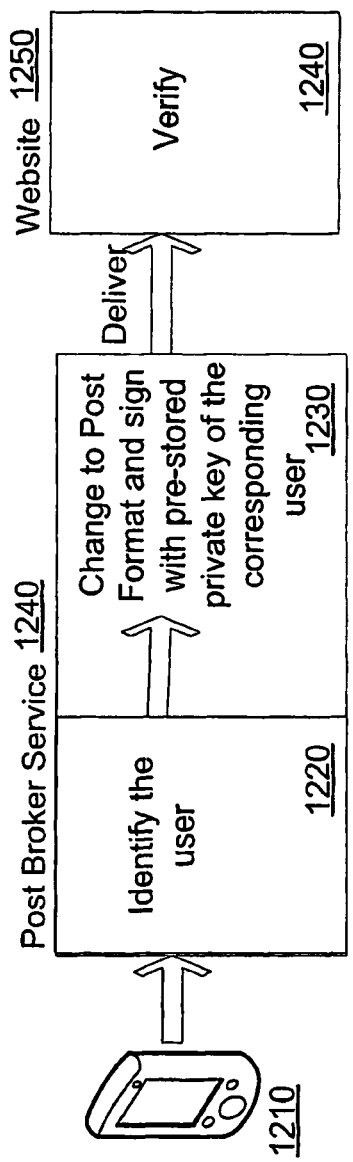
FIG. 12 is a conceptual diagram of one embodiment of a technique for posting material on a website based on one user's private key pre-stored in the post broker service.

FIG. 12 illustrates one embodiment of a technique for posting material on a website based on users' private key. In one embodiment, users may store their private key in the post broker service. Device 1210 may contain original data format to be posted. The original content may be sent from device 1210 to front end 1220 via, for example, multimedia messaging, or other communication method. Front end 1220 may analyze the received information to identify the user. In one embodiment, front end 1220 may get the user identification through the phone number. Operation 1230 may then change the original content to post format and sign into the website using a pre-stored private key associated to the user identification extracted at front end 1220. Operation 1230 may then deliver the post format content to be posted to website 1250. Website 1250 may then verify the identity and security information of the received data.

Figure 13:
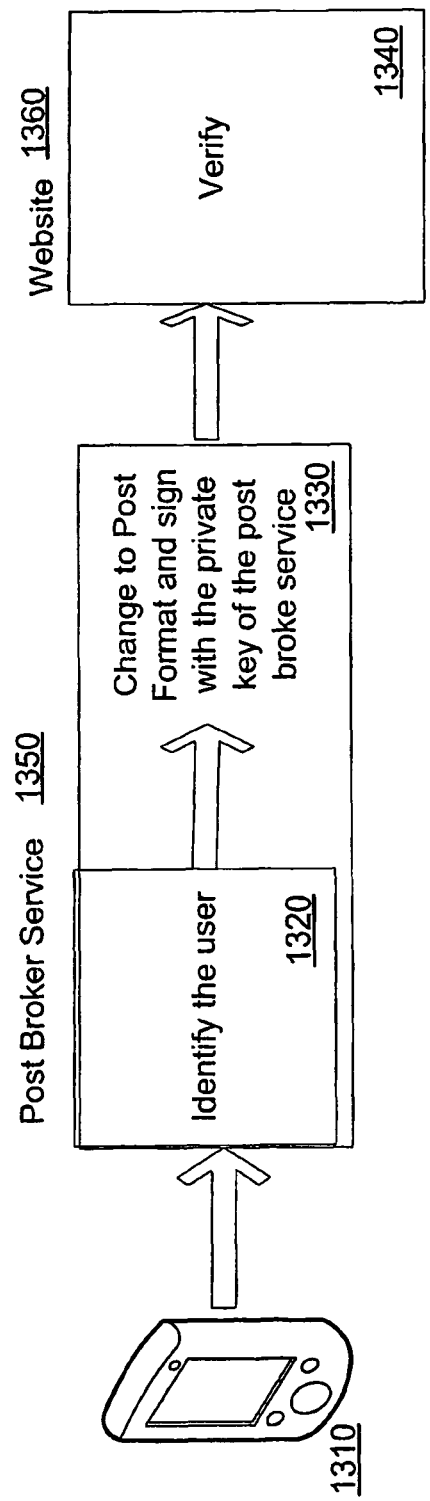
FIG. 13 is a conceptual diagram of one embodiment of a technique for posting material on a website based on the private key of a post broker service.

FIG. 13 illustrates one embodiment of a technique for posting material on a website based on the private key of post broker services. In one embodiment, users may register trusted post broker services in the websites. Device 1310 may contain original data format to be posted. The original content may be sent from device 1310 to front end 1320 via multimedia messaging, or other communication method. Front end 1320 may analyze the received information to identify the user. In one embodiment, front end 1320 may get the user identification through the phone number. Operation 1330 may then change the original content to post format and sign into the website using the post broker services' private key. Operation 1330 may then deliver the post format content to be posted to website 1360. Website 1360 may then verify the identity and security information of the received data.

Figure 14:
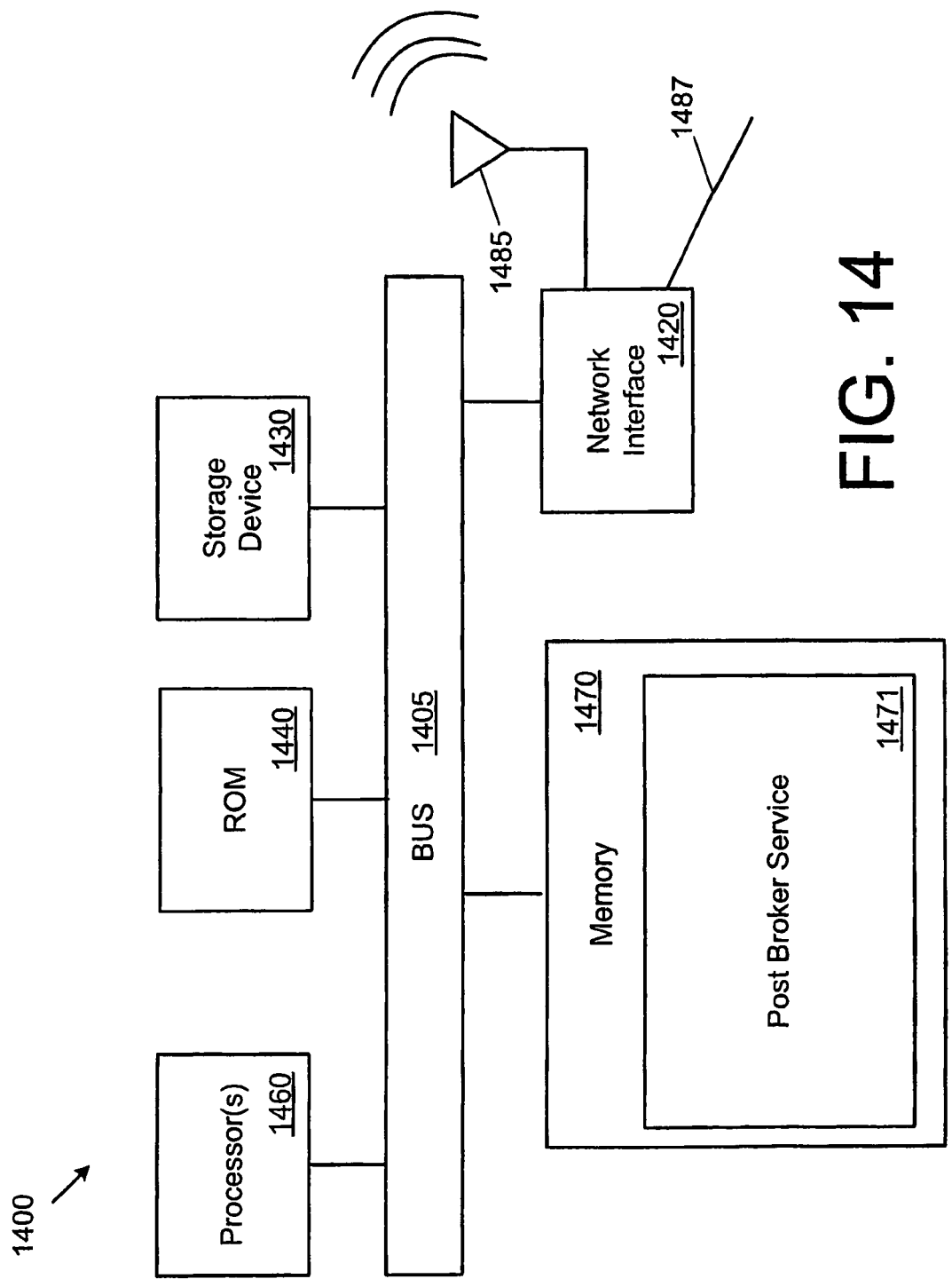
FIG. 14 is a conceptual diagram of one embodiment of a device to determine posting.

FIG. 14 illustrates one embodiment of a device that may conduct post services operations. Device 1400 may be implemented in a receiving, transmitting, wireless, broadband wired, access point or any combination of these type of device. Alternative devices may include more, fewer and/or different components. Device 1400 may include bus 1405 or other communication devices to communicate information, and processor 1460 coupled to bus 1405 that may process information. While device 1400 is illustrated with a single processor, device 1400 may include multiple processors and/or co-processors.

Device 1400 further may include memory 1470, coupled to bus 1405 and may store information and instructions that may be executed by processor 1460. Memory 1470 may be used to store temporary variables or other intermediate information during execution of instructions by processor 1460. Memory 1470 may include any type of memory known in the art, for example, dynamic random access memory (DRAM), static random access memory (SRAM), flash memory, etc. In one embodiment, memory 1470 may include any type of computer-readable storage medium that provides content (e.g., computer executable instructions) in a form readable by an electronic device (e.g., a computer, a personal digital assistant, a cellular telephone). For example, a machine-accessible medium includes read only memory (ROM); random access memory (RAM); magnetic disk storage media; optical storage media; flash memory devices; etc.

Memory 1470 may further include post broker service 1471 as described above. Device 1400 may also include read only memory (ROM) 1440 and/or other static storage device 1430 coupled to bus 1405 to store information and instructions. Data storage device 1430 may be a magnetic disk or optical disk and the corresponding drives may be coupled to device 1400.

Device 1400 may further include network interface(s) 1420 to provide access to a network. Network interface(s) may include, for example, a wireless network interface having one or more omnidirectional antennae 1485. Network interface(s) 1420 may also include, for example, a wired network interface to communicate with remote devices via network cable 1487, which may be, for example, an Ethernet cable, a coaxial cable, a fiber optic cable, a serial cable, or a parallel cable. Device 1400 may include additional and/or different components.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
receiving a single version of content to be posted on Internet to one or more websites via one or more remote servers;
formatting the received content according to a post format in which a signature is embedded for posting on the Internet to one or more websites via the one or more remote servers; and
sending the formatted content for posting on the Internet to one or more websites via the one or more remote servers and via one or more post services, wherein at least one of the post services is based on a post feed list, the at least one of the post service to post the formatted content on the Internet to one or more websites, wherein the post feed list includes a post feed which includes a description of the post service, wherein the one or more remote severs to perform the at least one of the post services on a Web server, wherein the at least one of the post services is invoked via a broker service, and wherein the broker service includes a render layer for adjusting contents for presentation.

2. The method of claim 1, further comprising performing a broker service to:

receive the formatted content, verify the formatted content, and send the verified content to the one or more remote servers.

3. The method of claim 1, wherein the received content may conform to different protocols including at least one of: MMS, SMTTP, or HTTP.

4. The method of claim 1, wherein the post format includes one or more of: a title, a time-stamp, an author, a category, keywords, an abstract, media content, or a signature.

5. The method of claim 1, wherein the broker service is available at multiple servers in multiple locations.

6. A non-transitory computer-readable storage medium having stored thereon instructions that, when executed, cause one or more processors to:

receive a single version of content to be posted on the Internet to one or more websites via one or more remote servers;

format the received content according to a post format in which a signature is embedded for posting on the Internet to one or more websites via the one or more remote servers; and send the formatted content for posting on the Internet to one or more websites via the one or more remote servers and via one or more post services, wherein at least one of the post services is based on a post feed list, the at least one of the post service to post the formatted content on the Internet to one or more websites, wherein the post feed list includes a post feed which includes a description of the post service, wherein the one or more remote severs to perform the at least one of the post services on a Web server, wherein the at least one of the post service is invoked via a broker service, and wherein the broker service includes a render layer for adjusting contents for presentation.

7. The non-transitory computer-readable storage medium of claim 6, wherein the post service corresponds to a web site.

8. The non-transitory computer-readable storage medium of claim 7, further comprising instructions that, when executed, cause the one or more processors to cause a client agent to invoke the post service via a post proxy that simulates the post service.

9. The non-transitory computer-readable storage medium of claim 6, further comprising instructions that, when executed, cause the one or more processors to provide a broker service to receive, verify and post content.

10. The non-transitory computer-readable storage medium-of claim 6, wherein the received content conforms to different protocols, and wherein the post format is one of a unified or extendible format.

11. The non-transitory computer-readable storage medium of claim 6, further comprising instructions that, when executed, cause the one or more processors to filter the content of the post format before being posted.

12. The non-transitory computer-readable storage medium of claim 6, further comprising instructions that, when executed, cause the one or more processors to render the content of the post format before being posted.

13. The non-transitory computer-readable storage medium of claim 6, further comprising instructions that, when executed, cause the one or more processors to utilize a post proxy to emulate a post service for a server if the post service is not available.

14. A system comprising:

a dynamic random access memory (DRAM); and an agent coupled with the DRAM, the agent operable to:

receive a single version of content to be posted on the Internet to one or more websites via the one or more remote servers, format the received content according to a post format in which a signature is embedded for posting on the Internet to one or more websites via the one or more remote servers, and send the formatted content for posting on the Internet to one or more websites via the one or more remote servers and via one or more post services, wherein at least one of the post services is based on a post feed list, the at least one of the post services to post the formatted content on the Internet to one or more websites, wherein the post feed list includes a post feed which includes a description of the post service, wherein the one or more remote severs to perform the at least one of the post services on a Web server, wherein the at least one of the post services is invoked via a broker service, and wherein the broker service includes a render layer for adjusting contents for presentation.

15. The system of claim 14, wherein the agent invokes the at least one of the post services corresponding to a web site.

16. The system of claim 14, wherein the received content may conform to different protocols.

17. The system of claim 14, wherein the agent is operable to filter the content of the post format before being posted.

18. The system of claim 14, further comprising a post proxy to emulate a post service for a server if the post service is not available.

19. The non-transitory computer-readable storage medium of claim 6, wherein the embedded signature is verified by at least one of:

a public key; or a private key.

20. The non-transitory computer-readable storage medium of claim 6, wherein the single version of content is in the form of one or more of: data structures or media files.

21. The method of claim 2, wherein the post feed list is formed by aggregating multiple instances of post feed in a single list.

* * * * *